(12) United States Patent (10) Patent No.: US 12,572,314 B2
Thompson et al. (45) Date of Patent: Mar. 10, 2026

(54) MULTIPLE DISPLAYS IN A FULL-FACE RESPIRATORY PROTECTED FACEPIECE

(71) Applicant: 3M INNOVATIVE PROPERTIES COMPANY, St. Paul, MN (US)

(72) Inventors: Darin K. Thompson, Huntersville, NC (US); William B. Howell, Pineville, NC (US); Traian Morar, Matthews, NC (US); Longin J. Kloc, Charlotte, NC (US); Johnathan R. Graves, Gainesville, GA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/862,671

(22) PCT Filed: May 19, 2023

(86) PCT No.: PCT/IB2023/055196
§ 371 (c)(1),
(2) Date: Nov. 4, 2024

(87) PCT Pub. No.: WO2023/233236
PCT Pub. Date: Dec. 7, 2023

(65) Prior Publication Data
US 2025/0291536 A1 Sep. 18, 2025

Related U.S. Application Data

(60) Provisional application No. 63/347,074, filed on May 31, 2022.

(51) Int. Cl.
G06F 3/14 (2006.01)
A62B 9/00 (2006.01)
(Continued)

(52) U.S. Cl.
CPC ............ *G06F 3/1423* (2013.01); *A62B 9/006* (2013.01); *A62B 18/08* (2013.01); *G06F 3/013* (2013.01)

(58) Field of Classification Search
CPC ........ G02B 27/0172; G02B 2027/0138; G02B 2027/014
See application file for complete search history.

(56) References Cited

U.S. PATENT DOCUMENTS 6,580,448 B1 * 6/2003 Stuttler ................ H04N 13/239
348/46
9,998,687 B2 6/2018 Lavoie
(Continued)

FOREIGN PATENT DOCUMENTS

WO 2022084761 A1 4/2022
WO 2024003789 A1 1/2024

OTHER PUBLICATIONS

International Search Report for PCT International Application No. PCT/IB2023/055196, mailed on Sep. 11, 2023, 3 pages.

*Primary Examiner* — Van N Chow
(74) *Attorney, Agent, or Firm* — David B. Patchett; Jonathan V. Sry

(57) ABSTRACT

A display control unit for personal protective equipment is described. The display control unit includes processing circuitry and an ocular unit in communication with the processing circuit. The processing circuitry is configured to determine an image arrangement based on at least one factor, where the determined image arrangement includes at least one image to be displayed on an ocular region and at least one image configuration parameter. The ocular unit is configured to display the at least one image on the ocular region based at least in part on the determined image arrangement.

20 Claims, 11 Drawing Sheets

(51) Int. Cl.
    *A62B 18/08*       (2006.01)
    *G06F 3/01*        (2006.01)

(56) References Cited

U.S. PATENT DOCUMENTS

| | | | | |
|---|---|---|---|---|
| 10,871,825 | B1 * | 12/2020 | Sztuk | .................... G06F 3/011 |
| 10,921,592 | B2 | 2/2021 | Lavoie | |
| 11,842,117 | B2 * | 12/2023 | Fukukawa | ............ H04N 7/183 |
| 2017/0123211 | A1 | 5/2017 | Lavoie | |
| 2018/0304107 | A1 | 10/2018 | Juran et al. | |
| 2019/0033594 | A1 | 1/2019 | Patil et al. | |
| 2020/0353295 | A1 | 11/2020 | Thompson et al. | |
| 2021/0109354 | A1 | 4/2021 | Lavoie | |
| 2021/0173474 | A1 * | 6/2021 | Sztuk | .................... G06F 3/013 |

* cited by examiner

System 10

Start

Determine an image arrangement based on at least one factor, the determined image arrangement including at least one image to be displayed on an ocular region and at least one image configuration parameter S100

Display the at least one image on the ocular region based at least in part on the determined image arrangement S102

End

MULTIPLE DISPLAYS IN A FULL-FACE RESPIRATORY PROTECTED FACEPIECE

CROSS REFERENCE TO RELATED APPLICATIONS

This application is a national stage filing under 35 U.S.C. 371 of PCT/IB2023/055196, filed 19 May 2023, which claims the benefit of U.S. Provisional Patent Application No. 63/347,074, filed 31 May 2022, the disclosure of which is incorporated by reference in its/their entirety herein.

TECHNICAL FIELD

This disclosure relates to a method and system for arrangement of one or more displays/images, in particular, images and/or displays arranged in personal protective equipment (PPE).

INTRODUCTION

Personal protective equipment (PPE) is equipment that is used for protection in particular environments such as environments where there is fire, electricity, structural collapse, dangerous temperatures, diseases, etc. PPE typically includes respirators such as full-face respirators, eye protection, full-face masks, half-face masks, etc. For example, a fire fighter entering a structure where a fire is present may use PPE such as a full-face respirator coupled to a self-contained breathing apparatus (SCBA) for face protection and to avoid inhaling dangerous gases that result from fires.

In addition to PPE, devices may be used to enhance awareness of the environment. Some of these devices include cameras such as thermal imaging cameras (TIC) which are typically configured to capture one or more levels of infrared light and allow first responder users, such as firefighters, to see areas that are normally not visible such as areas of heat, dark areas, etc. Other devices, may include oxygen level sensors, proximity sensors, navigation devices, etc. Oxygen level sensors allow PPE users to monitor amounts of oxygen left in an SCBA. Proximity sensors allow PPE users to monitor distance to certain objects such as walls that may not be visible in certain low visibility conditions, while navigation devices provide location and directional information which may be useful for finding egress points. For example, a first responder using a full-face respirator may want to use a handheld camera (e.g., such as a handheld TIC) by pointing the camera to areas of potentially dangerous heat. In addition, the first responder may want to use a handheld navigation device configured to display the location and directional information, while monitoring an oxygen sensor display worn on the wrist and listening to beeps indicating proximity to a wall. In other words, the first responder receives is critical information from several sources and is forced to frequently look in several directions, sometimes away from a typical line of sight (e.g., directly in front), to obtain the critical information.

At the very least in the examples above, the use of PPE in conjunction with devices may result in information overload, confusion, unnecessary head and eye movement, and disorientation.

SUMMARY

Some Claims advantageously provide a method, an apparatus (e.g., display control unit (DCU) for PPE), and a system for determining an image arrangement that includes one or more images (e.g., configured to show information such as symbols and data) and/or displaying the images in an ocular area, such as an area directly in front of the eyes of a user of a PPE. Any one of the images may include data, information, symbols, other images associated with another device such as a thermal camera, a thermal display, a proximity sensor, a navigation device, an oxygen sensor, another respirator, etc.

In one Claim, the DCU is couplable to and/or arranged to be integrated with any PPE such as a facepiece, respirator, etc. In some Claims, multiple displays (i.e., ocular areas, thermal display, etc.) in PPE such as a full-face respiratory protected facepiece are used. In some other Claims, by having two or more displays (e.g., types of displays) a user (e.g., a PPE user) may have immediate access to a wide range of data, In one Claim, types of displays include "look at" display such as micro-display, "look through," and/or "transparent display" such as a projected display, waveguide display, etc. In another Claim, having a combination of a look at display and one or more look through displays, the display control unit provides a user with immediate access to one or more pieces of information without clutter, overlap, thermal image, etc.

BRIEF DESCRIPTION OF THE DRAWINGS

A more complete understanding of Claims described herein, and the attendant advantages and features thereof, will be more readily understood by reference to the following detailed description when considered in conjunction with the accompanying drawings wherein:

DETAILED DESCRIPTION

Figure 1:
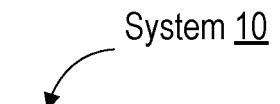
FIG. 1 shows an example system including at least an example respirator and an example display control unit according to the principles of the present disclosure.
Figure 1:
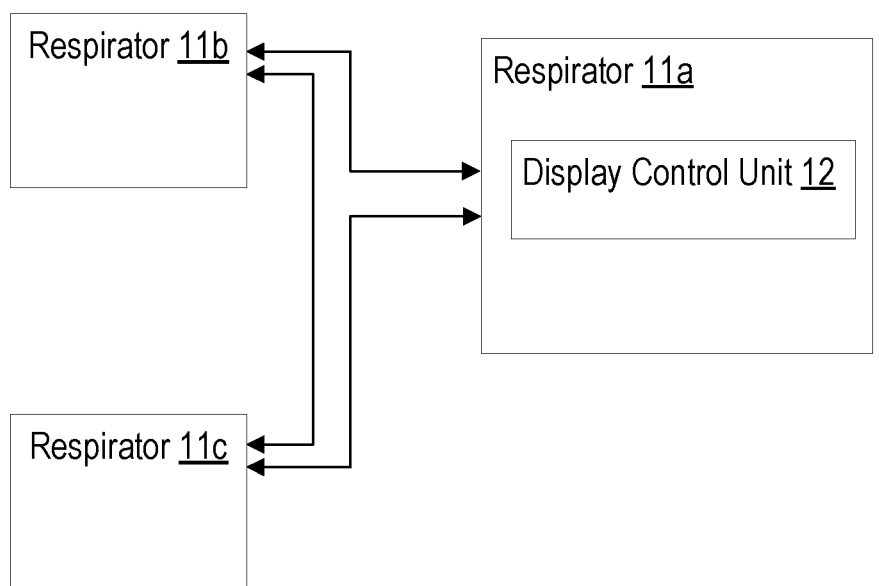

Apparatuses, methods, and systems are described for determining an image arrangement based on at least one factor, where the image arrangement includes at least one image and at least one image configuration parameter. The at least one image may be displayed on an ocular region of a display control unit based on the determined image arrangement. The ocular region may correspond to a user line of sight, e.g., a line of sight of a first responder looking through a transparent face shield of personal protective equipment (PPE). At least another image may be displayed, such as in a display of the display control unit (e.g., a viewfinder of a thermal imaging camera (TIC) display). The display may be configured to display the at least other image in a direction that is different from the user line of sight, e.g., the user moves the eyes downward to be able to see the at least other image on the display. The display and the ocular region may be in different locations and directions with respect to the eyes of the user. For example, the ocular region may be an area on the face shield of the PPE such as directly in front of the eyes of the PPE user, and the display may be located below the eyes the PPE user, i.e., in a different direction. The image displayed on the ocular region may include at least a portion of the at least other image of the display, e.g., a symbol associated with a thermal image from a TIC such as a symbol indicating a high temperature area. By displaying portions of one or more images corresponding to a display that are not in the user line of sight on an ocular region that is in front of the eyes of the PPE user, unnecessary eye movement and/or information overload is avoided.

Before describing in detail exemplary Claims, it is noted that the Claims reside primarily in combinations of apparatus components and processing steps related to determining an image arrangement of one or more images. One or more displays and/or ocular units and/or ocular regions and/or sensors (e.g., gas sensor, eye position sensor) and/or imaging sensing units (e.g., cameras) may be used. Accordingly, the system and method components have been represented where appropriate by conventional symbols in the drawings, showing only those specific details that are pertinent to understanding the Claims of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements, The terminology used herein is for the purpose of describing particular Claims only and is not intended to be limiting of the concepts described herein, As used herein, the singular forms "a", "an" and "the" are intended to include the plural forms as well, unless the context clearly indicates otherwise, It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs, It will be further understood that terms used herein should be interpreted as having a meaning that is consistent with their meaning in the context of this specification and the relevant art and will not be interpreted in an idealized or overly formal sense unless expressly so defined herein.

In Claims described herein, the joining term, "in communication with" and the like, may be used to indicate electrical or data communication, which may be accomplished by physical contact, induction, electromagnetic radiation, radio signaling, infrared signaling or optical signaling, for example, One having ordinary skill in the art will appreciate that multiple components may interoperate and modifications and variations are possible of achieving the electrical and data communication.

The term respirator may refer to any equipment (and/or device) such as personal protective equipment (PPE) and may include but are not limited to masks, full-face mask, half-face mask, full-face respirators, equipment used hazardous environments, full-face respiratory protected facepiece, etc. The term "display control unit" (DCU) used herein may be any kind of device and/or may be comprised in any other device such as a personal protective equipment (PPE). However, DCU is not limited as such and may be standalone. Further, DCU may refer to any device configurable to provide functions/features to interface at least with a user and/or other devices. The term "ocular region" may refer to a region of an area/volume associated with a visual range of a user of the DCU, e.g., a region that is in front of the eyes of PPE user when the PPE user is wearing the PPE. Further, ocular region may refer to a display and/or be a region where one or more images and/or symbols and/or data is displayed. An image as used herein may refer to any kind of image. Some nonlimiting examples of images may include one or more of an image associated with electromagnetic radiation, a thermal image, an optical image, a visible light image, an infrared image, a short-wave infrared (SWIR) image, a color image, a monochrome image, a photograph, a picture, a video, a symbol, data, etc. An image may be associated with any kind of image format such as one or more computer file formats. An ocular subregion may refer to a portion of the ocular region or a standalone region, e.g., a portion of a display, another display, etc. Displaying may refer to presenting and/or showing and/or projecting one or more images and/or symbols and/or data and/or information, e.g., for a user to see.

The term "image arrangement" may refer to one or more images which may include symbols and/or data and/or information and/or other images. Symbols may include data and/or information and/or other symbols. Each symbol may have at least one symbol characteristic and/or a symbol behavior and/or a symbol color and/or a symbol shape. Symbols may refer to one or more images. The images (and elements of the image such as symbols) may be arranged to have a position within a region, e.g., an ocular region, and/or characteristics. Composite image may refer to a combination of one or more images and/or data and/or information and/or symbols and/or portions of one or more images.

Referring now to the drawing figures, in which like elements are referred to by like reference numerals, there is shown in FIG. 1 a system 10 including at least one respirator 11 (i.e., respirator 11a) including an DCU 12. Each respirator 11 (i.e., respirators 11a, 11b, 11c) may be configured to communicate, e.g., via DCU 12 (and/or any of its components) with another respirator 11. For example, respirator 11a may be configured to communicate with respirator 11b and/or respirator 11c. Respirator 11b may be configured to communicate with respirator 11a and/or respirator 11c. Similarly, respirator 11c may be configured to communicate with respirator 11a and/respirator 11b. Although three respirators 11 are shown, system 10 is not limited as such and may include any quantity of respirators 11. Further, although not shown, each of respirators 11b, 11c may include a DCU 12.

In a nonlimiting example, respirator 11a may be worn by a first responder, such as a first responder, that communicates, such as via DCU 12, with another first responder wearing respirator 11b. Any respirator 11a may be configured to transmit/receive, such as via DCU 12, information/data such as an image arrangement, image, and/or image configuration parameter and/or display the image (e.g., based on the image arrangement).

Figure 2:
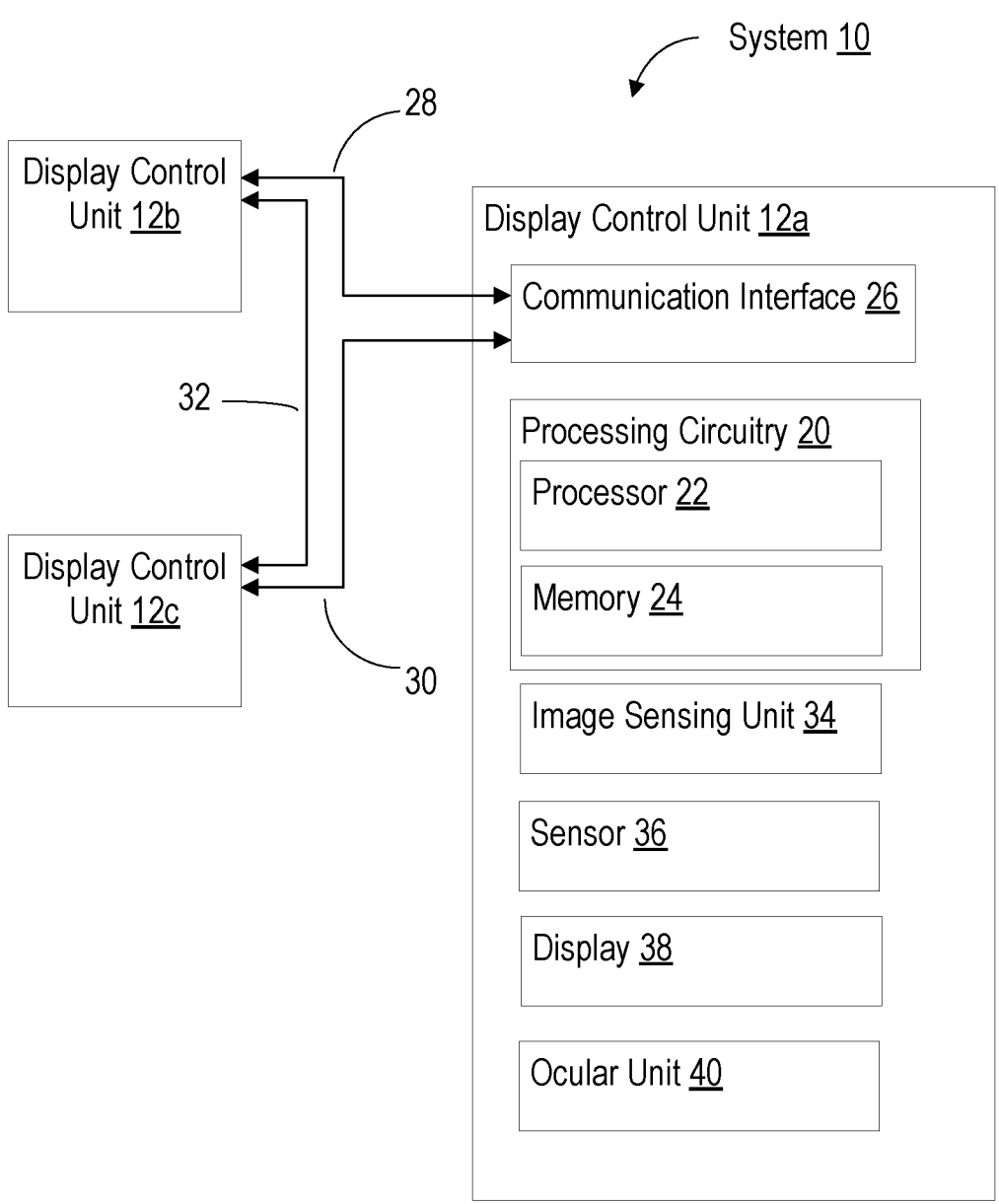
FIG. 2 shows a schematic diagram of an example display control unit in communication with other display control units according to the principles of the present disclosure.

FIG. 2 shows a schematic diagram of an example system 10 according to one or more Claims. System 10 includes one or more DCUs such as DCU 12a, 12b, 12c (collectively referred to as DCU 12) where DCU 12a may be in direct communication with each of DCUs 12b and 12c such as via one or more of wireless and/or wired communication using one or more communication protocols. Similarly, DCU 12b may be in direct communication with DCU 12c such as via one or more of wireless and/or wired communication using one or more communication protocols.

DCU 12 (e.g., DCU 12a) includes processing circuitry 20. The processing circuitry 20 may include a processor 22 and a memory 24, In particular, in addition to or instead of a processor, such as a central processing unit, and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 22 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Further, DCU 12 (e.g., DCU 12a) may include software stored internally in, for example, memory 24, The software may be executable by the processing circuitry 20, The processing circuitry 20 may be configured to control any of the methods and/or processes and/or features and/or tasks and/or steps described herein and/or to cause such methods, and/or processes and/or features and/or tasks and/or steps to be performed, e.g., by DCU 12, and/or be in communication with any of the components of DCU 12. In a nonlimiting example, processing circuitry 20 is configured to determine an image arrangement and/or cause ocular unit 40 to display at least one image. Processor 22 corresponds to one or more processors 22 for performing DCU 12 functions described herein, The memory 24 is configured to store data, programmatic software code and/or other information described herein. In some Claims, the software may include instructions that, when executed by the processor 22 and/or processing circuitry 20, causes the processor 22 and/or processing circuitry 20 to perform the processes described herein with respect to DCU 12, In addition, the DCU 12 (e.g., DCU 12a) may include a communication interface 26 configured to communicate at least with another DCU 12, e.g., 12b, 12c, and/or any other device, such as via one or more of wireless and/or wired communication using one or more communication protocols. More specifically, the communication interface 26 of DCU 12a may communicate with the DCU 12b via communication link 28, In addition, the communication interface 26 of the DCU 12a may communicate with DCU 12c via communication link 30, Similarly, DCU 12b may communicate with DCU 12c via communication link 32, Communication link 30 may be a wireless communication link that uses as suitable wireless communication protocol.

DCU 12 (e.g., DCU 12a) may also include image sensing unit 34 and/or sensor 36 and/or display 38 and/or ocular unit 40. Image sensing unit 34 and/or sensor 36 and/or display 38 and/or ocular unit 40 may be configured to communicate with any component/element of DCU12, e.g., may be in communication with processing circuitry (and/or processor 22 and/or memory 24) and/or communication interface 26. Image sensing unit 34 may be configured to capture and/or detect and/or record and/or sense and/or determine any image such as a thermal image. In a nonlimiting example, image sensing unit 34 may be a camera (e.g., a thermal camera) but is not limited as such and can be any device. Sensor 36 may be any type of sensor and/or may be configured to determine and/or detect and/or measure at least one of an eye movement, an eye location, a smoke level, a Self-contained breathing apparatus (SCBA) oxygen level, a harmful gas level, a display control unit location, a battery charge value, and/or any other parameter/variable/reading.

Display 38 may be configured to display one or more images, e.g., images corresponding to a camera, pages and/or symbols and/or data (e.g., associated with the images). In a nonlimiting example, an image may be displayed on display 38 at an angle downward from the eyes of a user. In other words, display 38 may be configured to be in an "out of sight, out of mind fashion" such that the user does not see the image displayed on display 38 when looking straight ahead through a face shield of a PPE, e.g., when wearing a respirator during a first responder event such as a fire.

Ocular unit 40 may be configured to perform any of the steps and/or features and/or tasks and/or methods described herein, e.g., display at least one image on an ocular region based at least in part on a determined image arrangement and/or determine the image arrangement based on at least one factor. Further, ocular unit 40 may be part of processing circuitry 20. Ocular unit 40 may also be a standalone unit and/or include any of the components of DCU 12, e.g., processing circuitry 20, processor 22, memory 24, communication interface 26, image sensing unit 34, sensor 36, display 38, etc.

Figure 3:
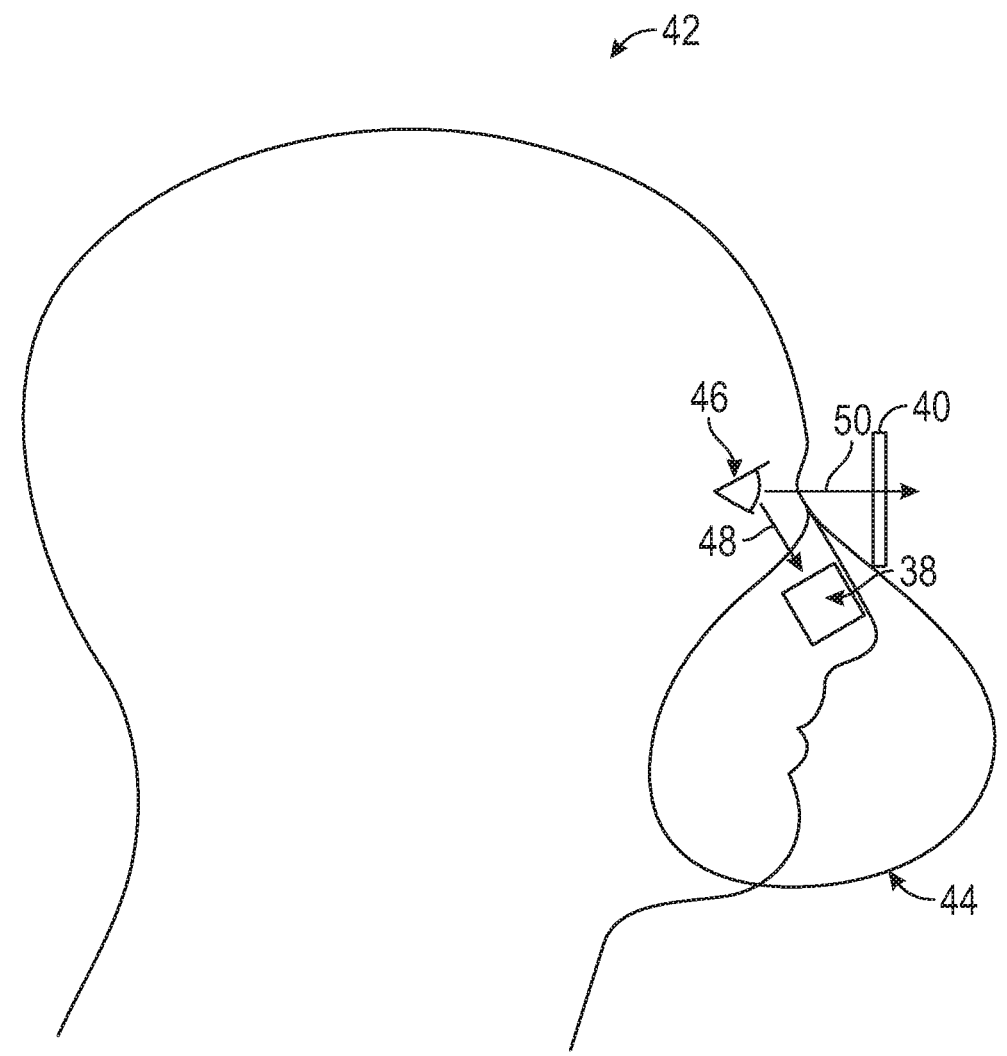
FIG. 3 shows PPE (e.g., a mask) including at least one element of an example display control unit according to the principles of the present disclosure.

Further, any DCU 12 (e.g., DCU 12a) may be configured to communicate with processing circuitry 20, processor 22 and/or memory 24 and/or image sensing unit 34 and/or sensor 36 and/or display 38 and/or ocular unit of another DCU 12 (e.g., DCU 12b) to perform the processes, features, tasks, and/or steps described in the present disclosure, FIG. 3 shows an example mask including at least one element of DCU 12, e.g., display 38 and/or ocular unit 40. More specifically, user 42 is wearing mask 44, which includes display 38 and/or ocular unit 40. Display 38 is oriented in a direction 48, e.g., so that user 42 can move eye 46 downward and look down toward display 38. For example, user 42 by looking down may see a thermal image (and/or other features) on display 38. User 42 may also look in another direction such as in direction 50. Ocular unit 40 may display at least one image based on a determined image arrangement. In one non limiting example, user 42 may be looking through ocular unit 40 (and/or an ocular region 58 of the ocular unit 40) while the mask is being used in a hazardous environment, such as structure on fire. Ocular unit 40 may be configured to display at least one element (e.g., a symbol, a portion of an image, an image) corresponding to display 38 and/or one or more images (and corresponding symbols), e.g., so that user 42 does not have to look down to display 38. Each one of display 38 and ocular unit 40 may be couplable (e.g., fixed, releasably couplable, etc.) to mask 44.

Figure 4:
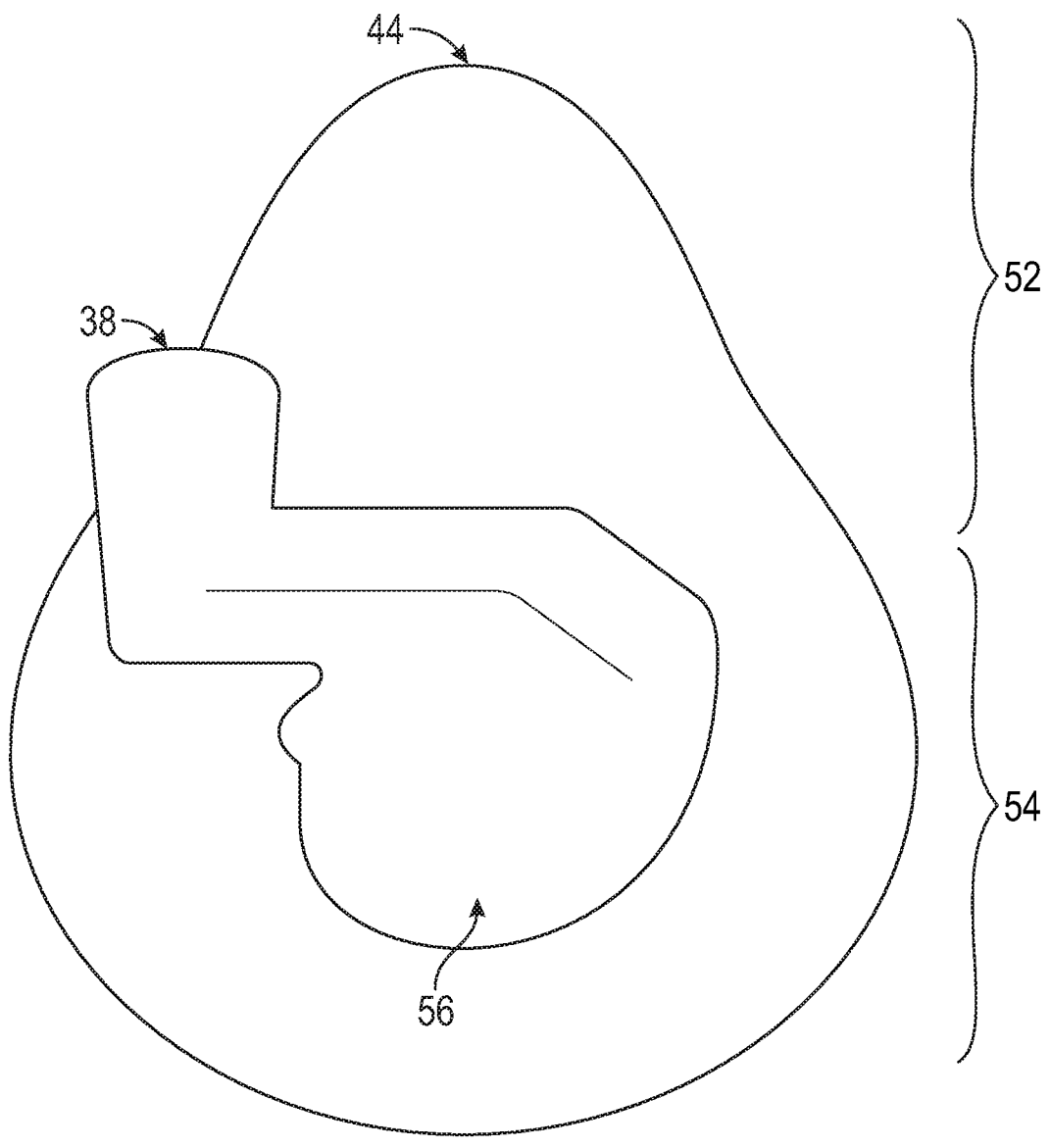
FIG. 4 shows a front view of a mask including at least one element of an example display control unit according to the principles of the present disclosure.

FIG. 4 shows a front view of an example mask 44. Mask 44 has a first area 52 corresponding to a nose area, and a second area 54 corresponding to a mouth area. Further, mask 44 includes display 38 and display assembly 56 coupled to the display 38 and mask 44.

Figure 5:
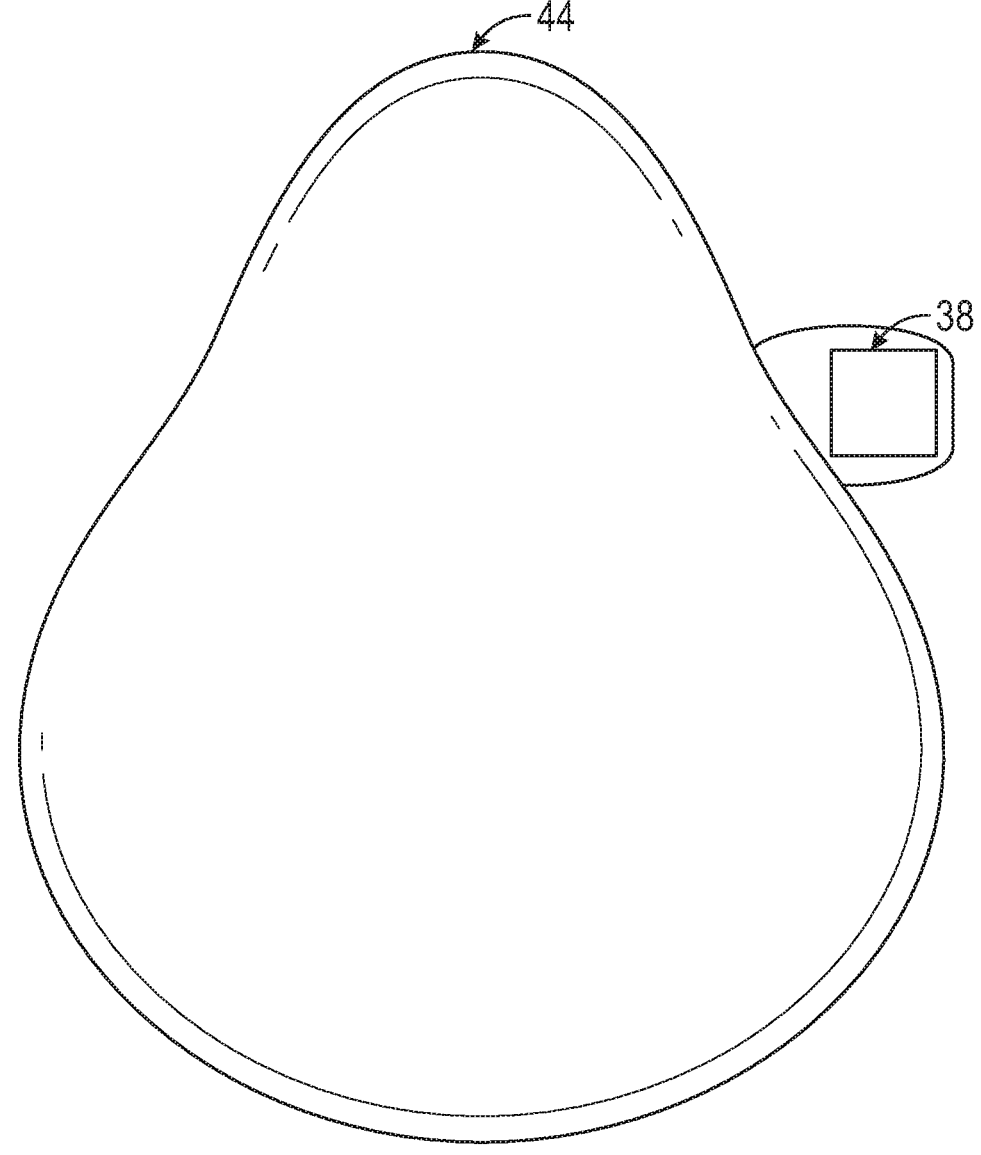
FIG. 5 shows a rear view of a mask including at least one element of an example display control unit according to the principles of the present disclosure.

FIG. 5 shows a rear view of the example mask 44 of FIG. 4, including display 38. Although mask 44 is not shown as including ocular unit 40, mask 44 may include ocular unit 40 and/or any other component of DCU 12.

Figure 6:
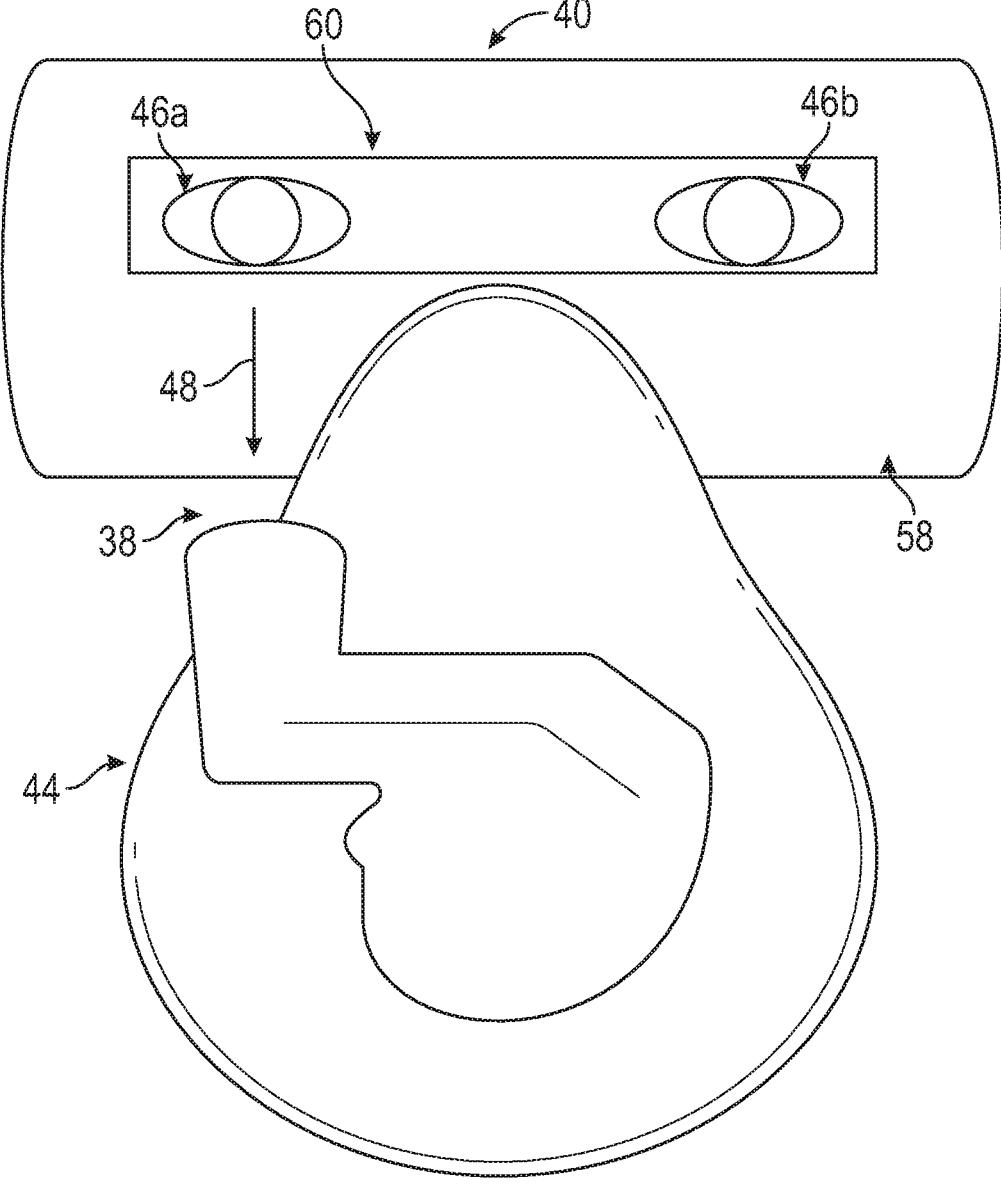
FIG. 6 shows a front view of a mask including at least an example ocular unit of a display control unit according to the principles of the present disclosure.

FIG. 6 shows a rear view of the example mask 44 of FIGS. 4 and 5, including an ocular unit 40. Ocular unit 40 includes an ocular region 58, e.g., in front of eyes 46*a*, 46*b* of user 42, and an ocular subregion 60. Ocular region 58 and/or ocular subregion 60 may be configured to display one or more images (e.g., of a determined image arrangement) and/or symbols and/or data, and may be aligned with eyes 46, using sensor 36, such as a sensor configured to determine the position of eyes 46. Ocular region 58 and/or ocular subregion 60 may be configured such that user does not have to look in direction 48 to see one or more images and/or symbols and/or information and/or data, which may be critical during a first responder event. Ocular unit 40 may be coupled to mask 44.

Figure 7:
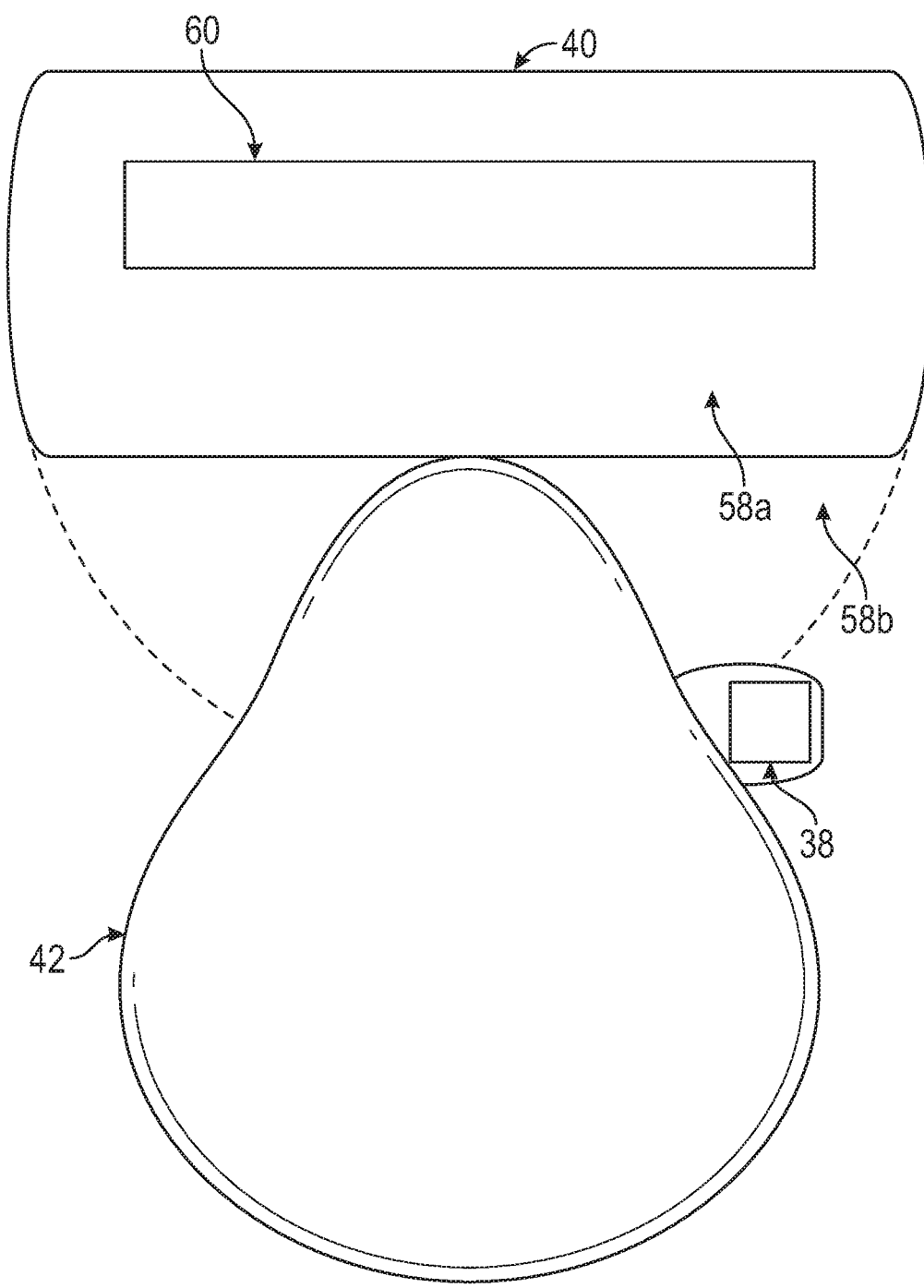
FIG. 7 shows a rear view of a mask including at least an example ocular unit of a display control unit according to the principles of the present disclosure.

FIG. 7 is a rear view of example mask 44 of FIG. 5, where ocular unit 40 is placed at a different location of mask 44 and may extend to include ocular regions 58*a*, 58*b*, which may include ocular subregion 60.

Figure 8:
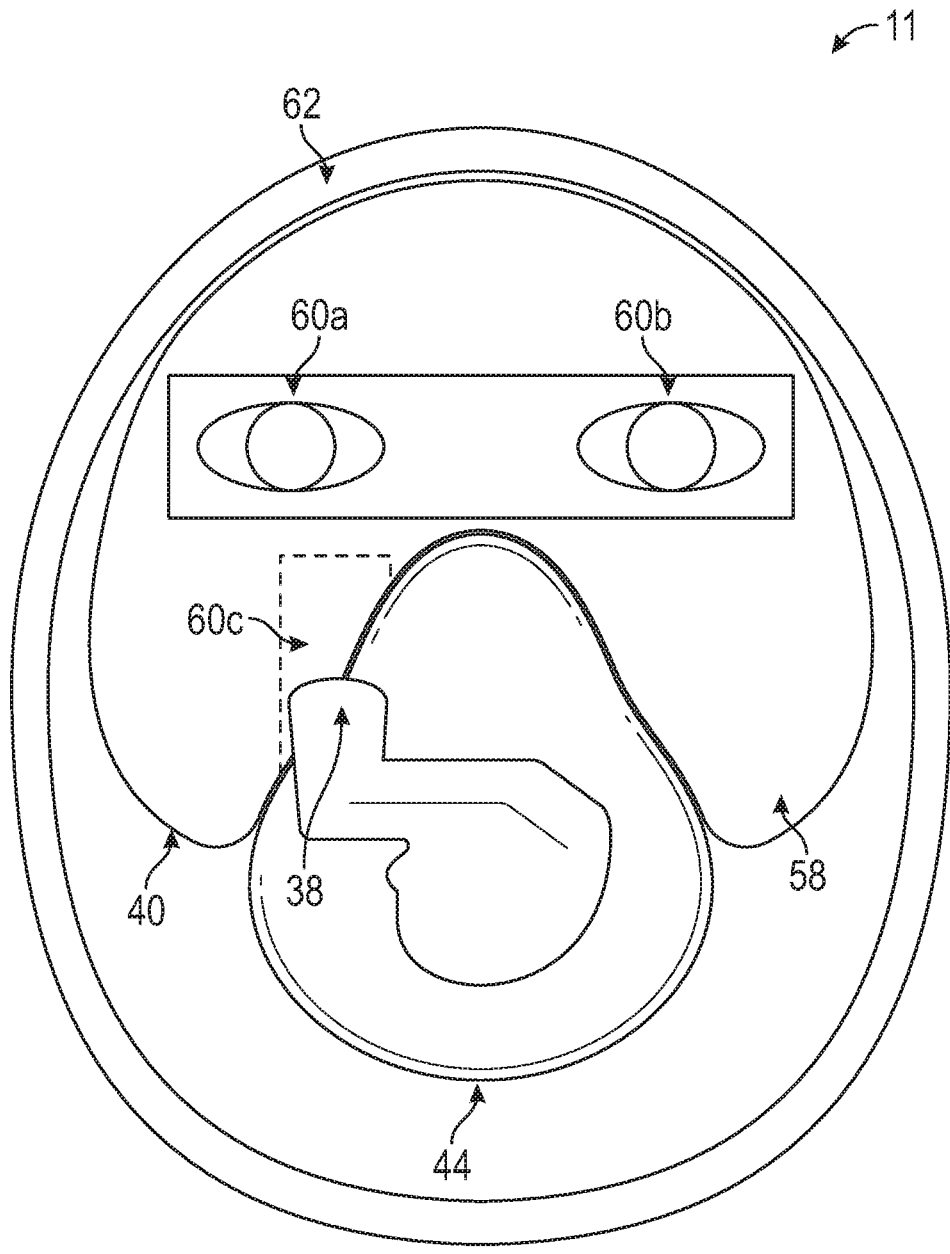
FIG. 8 shows a front view of a respirator including at least an example ocular unit of a display control unit according to the principles of the present disclosure.

FIG. 8 is a front view of an example respirator 11. Respirator 11 may include ocular unit 40, mask 44, and seal 62 (e.g., such as face seal). Mask 44 includes display 38 and may be coupled to respirator 11. Further, ocular unit 40 may be coupled to and/or disposed on and/or placed within the respirator 11 (e.g., coupled to a face shield of respirator 11) and/or mask 44. Ocular unit 40 includes ocular region 58, which may include one or more ocular subregions 60*a*, 60*b*, 60*c* (referred to collectively herein as ocular subregion 60). In a nonlimiting example, ocular subregion 60*c* may correspond to an area associated with display 38. Ocular subregion 60*c* (and/or any other subregion) may be enabled/disabled based on whether display 38 is turned on and/or displaying and/or triggered to display. Ocular sub region 60*c* (and/or any other subregion) may be configured to display a composite image including at least a portion of an image of display 38.

Figure 9:
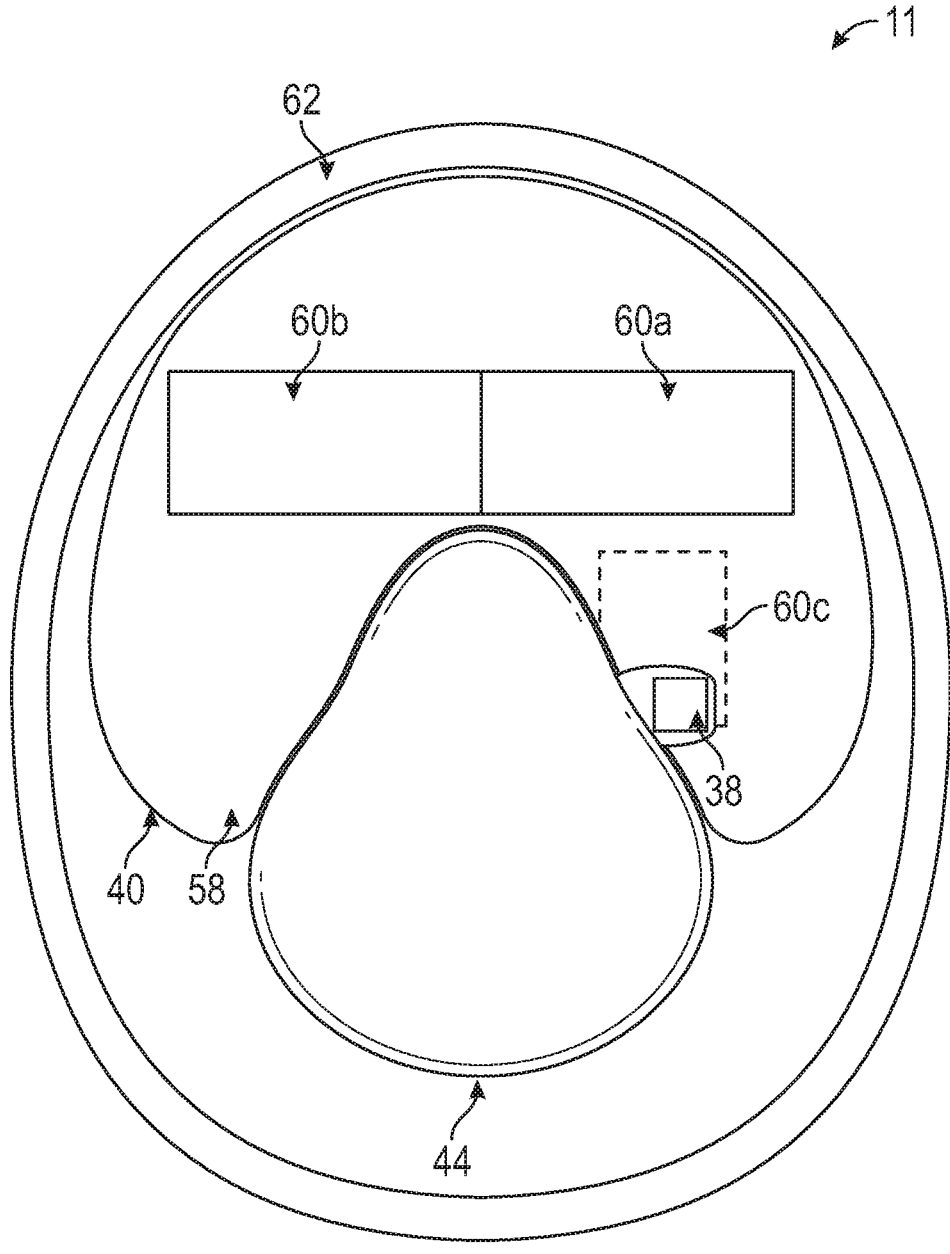
FIG. 9 shows a rear view of a respirator including at least an example ocular unit of a display control unit according to the principles of the present disclosure.

FIG. 9 is a rear view of the example respirator 11 of FIG. 8. Although ocular unit 40 has been shown as including one ocular region 58 and three ocular subregions 60*a*, 60*b*, 60*c*, ocular unit 40 is not limited as such and may include any quantity of ocular regions 58 and ocular subregions 60.

Figure 10:
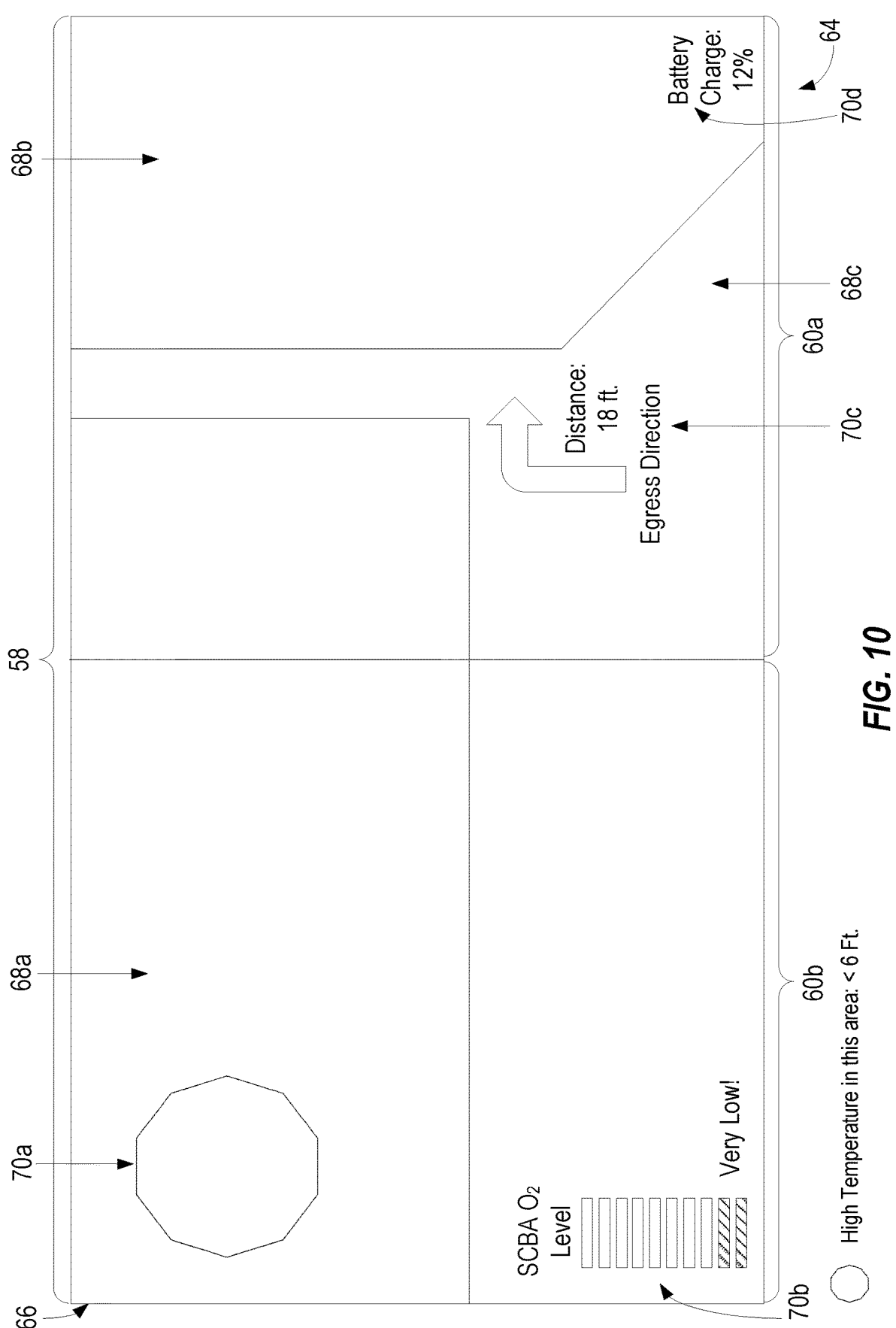
FIG. 10 shows an example image arrangement including at least one image according to the principles of the present disclosure.

FIG. 10 shows an example image arrangement including at least one image 66 (e.g., as seen by a user of DCU 12 such as when the user is wearing a respirator 11). The at least one image 66 is displayed on ocular region 58 (e.g., coupled to a face shield of a respirator 11) which may include one or more ocular subregions 60*a*, 60*b*. Ocular region 58 may refer to one or more displays. Ocular subregion 60 may refer to a portion of ocular region 58 and/or one or more displays. The at least one image 66 includes one or more objects 68 such as a wall 68*a*, another wall 68*b*, and a floor 68*c* (elements 68*a*-*c* are referred to collectively herein as elements 68) that a user of DCU 12 may be able to see when using DCU 12. For example, a user 42 may see objects 68 when wearing a respirator 11, e.g., via a face shield, and/or when displayed by ocular unit 40 (e.g., such as via images captured by image sensing unit 34 (such as a camera).

Further, the at least one image 66 may include one or more symbols 70. Any of the symbols 70 (and/or image 66) may be arranged according to one or more configuration parameters and/or one or more factors. For example, any of the symbols 70 (and/or image 66) may be positioned and/or moved and/or hidden and/or enabled and/or disabled and/or sized and/or shaped and/or cause to behave in a predetermined fashion. Any of the symbols 70 (and/or image 66) may be positioned (e.g., on ocular region 58 and/or ocular subregion 60) based on at least one configuration parameters such as a symbol position parameter and/or displayed for a period of time based on a symbol display period parameter. The following nonlimiting examples describe example arrangements of symbols 70 on one or more images 66.

In a nonlimiting example, symbol 70*a* indicates a warning about an area of high temperature, which is shown by a polygon, and/or that the high temperature may be located within a determined distance, e.g., less than 6 ft. That is, symbol 70*a* is arranged on image 66 based on a factor such as a sensor measurement (e.g., by sensor 36) and/or a user input (e.g., an input received by processing circuitry 20 and/or communication interface 26 requesting to move symbol 70*a*). However, any symbol 70 may be determined/provided by (or retrieved by) one or more of processing circuitry 20 and/or communication interface 26 (e.g., from another DCU 12, another device, etc.), image sensing unit 34 (e.g., thermal camera), sensor 36 (e.g., temperature sensor) and/or display 38 (e.g., from an image of display 38) and/or ocular unit 40.

In another nonlimiting example, symbol 70*b* may include a level indication such as Oxygen ($O_2$) level in a Self-contained breathing apparatus (SCBA). The level indication may be provided by an external device to DCU 12 and/or by sensor 36 and/or image sensing unit 34. Symbol 70*b* is arranged to be on the lower left corner of image 66 (displayed on ocular region 58) which may be based on a user input (such as a configuration to have symbols associated with oxygen levels displayed in a predefined location on the ocular region 58).

In one limiting example, symbol 70*c* may indicate a direction toward a point such as a direction toward an egress point on a structure and/or a distance to the egress point. In one nonlimiting example, DCU 12 (and/or any of its components) may be configured to determine symbol 70*c* is included in the image arrangement based on whether another symbol 70 is triggered such as symbol 70*a* and 70*b* indicating a critical condition. In other words, DCU 12 may be configured determine whether a symbol 70 such as symbol 70*c* is included on image 66 based on an event having a high priority, e.g., an indication of low oxygen and/or a dangerous temperature. Symbol 70*d* may indicate a percentage of charge, e.g., 12%, such as determined and/or indicated by sensor 36 (e.g., battery sensor). In another nonlimiting example, symbol 70*d* may be included on image 66 based on a predetermined threshold of percentage of charge and/or displayed for a period of time.

The examples above describe several nonlimiting examples of arrangements of symbols 70 (symbols 70*a*-*d* are referred to collectively herein as symbols 70). However, the arrangement is not limited to symbols and may also be applied to images. For example, images may be arranged such as to include one or more images provided by one or more components of DCU 12, such as processing circuitry 20 and/or communication interface 26 (e.g., from another DCU 12, another device, etc.), image sensing unit 34 (e.g., thermal camera), sensor 36 (e.g., infrared sensor) and/or display 38 (e.g., an image of display 38) and/or ocular unit 40.

Figure 11:
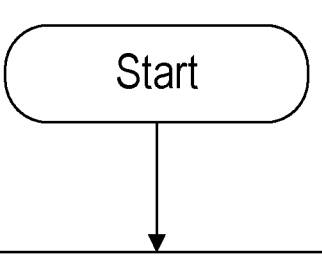
FIG. 11 shows a flowchart of an example process in a display control unit according to the principles of the present disclosure.
Figure 11:
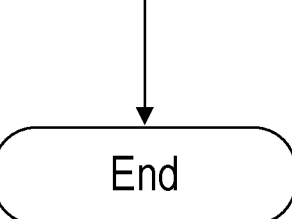

FIG. 11 shows a flowchart of an example process (i.e., method) in DCU 12, One or more blocks described herein may be performed by one or more elements of DCU 12 such as by one or more of processing circuitry 20, processor 22, memory 24, communication interface 26, image sensing unit 34, sensor 36, display 38, ocular unit 40 (which may be part of processing circuitry 20). DCU 12, such as via one or more of processing circuitry 20, processor 22, memory 24, communication interface 26, image sensing unit 34, sensor 36, display 38, ocular unit 40, is configured to determine (Block S100), such as via processing circuitry 20 and/or display 38 and/or ocular unit 40, an image arrangement 64 based on at least one factor, the determined image arrangement 64 including at least one image 66 to be displayed on an ocular region 58 and at least one image configuration parameter; and display (Block S102), such as via processing circuitry 20 and/or display 38 and/or ocular unit 40, the at least one image 66 on the ocular region 58 based at least in part on the determined image arrangement 64.

In some claims, the display control unit 12 further includes a display 38, and the method further includes displaying, on the display 38, the at least one other image in a first direction 48, the at least one other image being based on a thermal image capture.

In some other claims, any one of the at least one image 66 and the at least one image configuration parameter is based on the at least one other image.

In one claim, the displayed at least one image 66 on the ocular region 58 corresponds to a second direction 50, the displayed at least one image 66 including a see-through portion, the second direction being a user line of sight.

In another claim, at least one of: the ocular region 58 includes at least one of a first ocular subregion 60*a*, a second ocular subregion 60*b*, and a third ocular subregion 60*c*; and at least one of the ocular region 58, the first ocular subregion 60*a*, the second ocular subregion 60*b*, and the third ocular subregion 60*c* is positioned based on at least one of an eye location and an eye movement measured by a sensor of the display control unit.

In some claims, the at least one image 66 to be displayed on the ocular region 58 includes at least one of a first image 66*a*, a second image 66*b*, and a third image corresponding 66*c* to the first ocular subregion 60*a*, the second ocular subregion 60*b*, and the third ocular subregion 60*c*, respectively, at least a portion of any one of the first image 66*a*, the second image 66*b*, and the third image 66*c* being movable within the ocular region, Images 66*a-c* are referred to collectively herein as image 66.

In some other claims, at least one of the first, second, and third ocular subregions 60*a*, 60*b*, 60*c* is one of enabled and disabled based on at least one of whether at least one other image is being displayed on a display 38 of the display control unit 12 and a user input.

In one claim, the method further includes, when any one of the first, second, and third ocular subregions 60*a*, 60*b*, 60*c* is enabled and the at least one other image is to be displayed on the display of the display control unit: the display 38 to turned off; and the ocular unit 40 displays a composite image on the corresponding enabled ocular subregion 60, the composite image including at least a portion of the at least one image and the at least one other image, any one of the at least one image and the at least one other image being any one of a thermal image, a visible light image, and a short-wave infrared, SWIR, image.

In another claim, the method further includes measuring, such as via sensor 36, at least one of an eye movement, an eye location, a smoke level, an SCBA oxygen level, a harmful gas level, a display control unit location, and a battery charge value.

In some claims, the at least one factor includes at least one of a sensor measurement, an event priority, a message, an alert, a direction, and a user input.

In some other claims, the at least one image 66 includes any one of at least one symbol 70 and the at least one symbol 70 with data associated with the at least one symbol 70.

In one claim, the at least one configuration parameter includes a symbol display period indicating a range of time that the at least one symbol 70 is to be displayed by the ocular unit 40.

In another claim, the at least one configuration parameter includes the at least one symbol position parameter, where the at least one symbol position parameter is determined based on at least one of the ocular region, the ocular subregion, a user location, a user input, an eye movement, an eye location, an environment feature, and an environment feature location. The at least one symbol position parameter indicates where the at least one symbol 70 is to be displayed on at least one of the ocular region 58 and the ocular subregion 60; and displaying the at least one image 66 of the determined image arrangement 64 including the at least one symbol 70 based on the at least one symbol position parameter.

In some claims, the at least one symbol 70 is determined based on at least one other symbol associated with at least one other image of the display 38.

In some other claims, the display control unit 12 is couplable to any one of a mask 44 and a respirator 11.

It will be appreciated by persons skilled in the art that the present claims are not limited to what has been particularly shown and described herein above, In addition, unless mention was made above to the contrary, it should be noted that all of the accompanying drawings are not to scale. A variety of modifications and variations are possible in light of the above teachings and following claims.

The invention claimed is:

1. A display control unit for personal protective equipment, the display control unit comprising processing circuitry and an ocular unit in communication with the processing circuit:

the processing circuitry being configured to:

determine an image arrangement based on at least one factor, the determined image arrangement including at least one image to be displayed on an ocular region and at least one image configuration parameter, wherein the at least one image includes any one of at least one symbol and the at least one symbol with data associated with the at least one symbol, the at least one configuration parameter includes the at least one symbol position parameter, the at least one symbol position parameter being determined based on at least one of the ocular region, the ocular subregion, a user location, a user input, an eye movement, an eye location, an environment feature, and an environment feature location, the at least one symbol position parameter indicating where the at least one symbol is to be displayed on at least one of the ocular region and the ocular subregion; and the ocular unit being configured to:

display the at least one image on the ocular region based at least in part on the determined image arrangement; and display the at least one image of the determined image arrangement including the at least one symbol based on the at least one symbol position parameter.

2. The display control unit of claim 1, wherein the display control unit further includes a display configured to:

display at least one other image in a first direction, the at least one other image being based on a thermal image capture.

3. The display control unit of claim 2, wherein any one of the at least one image and the at least one image configuration parameter is based on the at least one other image.

4. The display control unit of claim 1, wherein the displayed at least one image on the ocular region corresponds to a second direction, the displayed at least one image including a see-through portion, the second direction being a user line of sight.

5. The display control unit of claim 1, wherein at least one of:

the ocular region includes at least one of a first ocular subregion, a second ocular subregion, and a third ocular subregion; and at least one of the ocular region, the first ocular subregion, the second ocular subregion, and the third ocular subregion is positioned based on at least one of an eye location and an eye movement measured by a sensor of the display control unit.

6. The display control unit of claim 5, wherein the at least one image to be displayed on the ocular region includes at least one of a first image, a second image, and a third image corresponding to the first ocular subregion, the second ocular subregion, and the third ocular subregion, respectively, at least a portion of any one of the first image, the second image, and the third image being movable within the ocular region.

7. The display control unit of claim 5, wherein at least one of the first, second, and third ocular subregions is one of enabled and disabled based on at least one of whether at least one other image is being displayed on a display of the display control unit and a user input.

8. The display control unit of claim 7, wherein, the processing circuitry being further configured to, when any one of the first, second, and third ocular subregions is enabled and the at least one other image is to be displayed on the display of the display control unit:

cause the display to turn off; and cause the ocular unit to display a composite image on the corresponding enabled ocular subregion, the composite image including at least a portion of the at least one image and the at least one other image, any one of the at least one image and the at least one other image being any one of a thermal image, a visible light image, and a short-wave infrared, SWIR, image.

9. The display control unit of claim 1, wherein the display control unit further includes a sensor, the sensor being configured to measure at least one of an eye movement, an eye location, a smoke level, an SCBA oxygen level, a harmful gas level, a display control unit location, and a battery charge value.

10. The display control unit of claim 1, wherein the at least one factor includes at least one of a sensor measurement, an event priority, a message, an alert, a direction, and a user input.

11. The display control unit of claim 1, wherein the at least one configuration parameter includes a symbol display period indicating a range of time that the at least one symbol is to be displayed by the ocular unit.

12. The display control unit of claim 1, wherein the at least one symbol is determined based on at least one other symbol associated with at least one other image of the display.

13. The display control unit of claim 1, wherein the display control unit is couplable to any one of a mask and a respirator.

14. A display control unit for personal protective equipment, the display control unit comprising processing circuitry and an ocular unit in communication with the processing circuit:

the processing circuitry being configured to:

determine an image arrangement based on at least one factor, the determined image arrangement including at least one image to be displayed on an ocular region and at least one image configuration parameter, wherein the at least one image includes any one of at least one symbol and the at least one symbol with data associated with the at least one symbol, wherein the at least one configuration parameter includes a symbol display period indicating a range of time that the at least one symbol is to be displayed by the ocular unit; and the ocular unit being configured to:

display the at least one image on the ocular region based at least in part on the determined image arrangement.

15. The display control unit of claim 14, the at least one configuration parameter includes the at least one symbol position parameter, the at least one symbol position parameter being determined based on at least one of the ocular region, the ocular subregion, a user location, a user input, an eye movement, an eye location, an environment feature, and an environment feature location, the at least one symbol position parameter indicating where the at least one symbol is to be displayed on at least one of the ocular region and the ocular subregion; and the ocular unit being further configured to display the at least one image of the determined image arrangement including the at least one symbol based on the at least one symbol position parameter.

16. A display control unit for personal protective equipment, the display control unit comprising processing circuitry and an ocular unit in communication with the processing circuit:

the processing circuitry being configured to:

determine an image arrangement based on at least one factor, the determined image arrangement including at least one image to be displayed on an ocular region and at least one image configuration parameter, wherein the at least one image includes any one of at least one symbol and the at least one symbol with data associated with the at least one symbol, wherein the at least one symbol is determined based on at least one other symbol associated with at least one other image of the display; and the ocular unit being configured to:

display the at least one image on the ocular region based at least in part on the determined image arrangement.

17. A display control unit for personal protective equipment, the display control unit comprising processing circuitry and an ocular unit in communication with the processing circuit:

the processing circuitry being configured to:

determine an image arrangement based on at least one factor, the determined image arrangement including at least one image to be displayed on an ocular region and at least one image configuration parameter, wherein at least one of:

the ocular region includes at least one of a first ocular subregion, a second ocular subregion, and a third ocular subregion; and at least one of the ocular region, the first ocular subregion, the second ocular subregion, and the third ocular subregion is positioned based on at least one of an eye location and an eye movement measured by a sensor of the display control unit; and the ocular unit being configured to:

display the at least one image on the ocular region based at least in part on the determined image arrangement, wherein the at least one image to be displayed on the ocular region includes at least one of a first image, a second image, and a third image corresponding to the first ocular subregion, the second ocular subregion, and the third ocular subregion, respectively, at least a portion of any one of the first image, the second image, and the third image being movable within the ocular region.

18. The display control unit of claim 17, wherein at least one of the first, second, and third ocular subregions is one of enabled and disabled based on at least one of whether at least one other image is being displayed on a display of the display control unit and a user input.

19. A display control unit for personal protective equipment, the display control unit comprising processing circuitry and an ocular unit in communication with the processing circuit:

the processing circuitry being configured to:

determine an image arrangement based on at least one factor, the determined image arrangement including at least one image to be displayed on an ocular region and at least one image configuration parameter, wherein at least one of:

the ocular region includes at least one of a first ocular subregion, a second ocular subregion, and a third ocular subregion; and at least one of the ocular region, the first ocular subregion, the second ocular subregion, and the third ocular subregion is positioned based on at least one of an eye location and an eye movement measured by a sensor of the display control unit; and the ocular unit being configured to:

display the at least one image on the ocular region based at least in part on the determined image arrangement, wherein at least one of the first, second, and third ocular subregions is one of enabled and disabled based on at least one of whether at least one other image is being displayed on a display of the display control unit and a user input.

20. The display control unit of claim 19, wherein, the processing circuitry being further configured to, when any one of the first, second, and third ocular subregions is enabled and the at least one other image is to be displayed on the display of the display control unit:

cause the display to turn off; and cause the ocular unit to display a composite image on the corresponding enabled ocular subregion, the composite image including at least a portion of the at least one image and the at least one other image, any one of the at least one image and the at least one other image being any one of a thermal image, a visible light image, and a short-wave infrared, SWIR, image.

* * * * *